US007138999B2

(12) United States Patent
Alliez et al.

(10) Patent No.: US 7,138,999 B2
(45) Date of Patent: Nov. 21, 2006

(54) REFINEMENT OF A TRIANGULAR MESH REPRESENTING A THREE-DIMENSIONAL OBJECT

(75) Inventors: Pierre Alliez, Cesson Sévigné (FR); Nathalie Laurent-Chatenet, Vignoc (FR)

(73) Assignee: France Telecom, Paris (FR)

( * ) Notice: Subject to any disclaimer, the term of this patent is extended or adjusted under 35 U.S.C. 154(b) by 389 days.

(21) Appl. No.: 10/312,207

(22) PCT Filed: Jun. 21, 2001

(86) PCT No.: PCT/FR01/01964

§ 371 (c)(1),
(2), (4) Date: Jul. 14, 2003

(87) PCT Pub. No.: WO01/99052

PCT Pub. Date: Dec. 27, 2001

(65) Prior Publication Data

US 2004/0090438 A1    May 13, 2004

(30) Foreign Application Priority Data

Jun. 23, 2000    (FR) .................................. 00 08107

(51) Int. Cl.
*G06T 15/00* (2006.01)
(52) U.S. Cl. ........................ 345/423; 345/426; 345/582

(58) Field of Classification Search ........ 345/418–420, 345/423–424, 426–427, 619, 582, 586, 440–442
See application file for complete search history.

(56) References Cited

U.S. PATENT DOCUMENTS 5,453,934 A    9/1995    Taghavi et al.
5,602,979 A    2/1997    Loop (Continued)

FOREIGN PATENT DOCUMENTS

WO    WO 99/18517    4/1999
WO    WO 99/34336    7/1999

OTHER PUBLICATIONS

"Simulation of Static and Dynamic Wrinkles of Skin", Yin Wu et al., Proceedings Computer Animation '96, Geneva, Switzerland, Jun. 3-4, 1996, pp. 90-97.

(Continued)

*Primary Examiner*—Phu K. Nguyen
(74) *Attorney, Agent, or Firm*—Shewchuk IP Services; Jeffrey D. Shewchuk

(57) ABSTRACT

The invention concerns the refinement of a triangular mesh representing a three-dimensional object (3D), said mesh consisting of an arrangement of vertices and triangular surfaces, each defined by three references to the vertices which it links, and having three edges each linking two of said vertices. The invention is characterized in that said method comprises a step which consists in selecting at least a region of interest, said mesh refinement being carried out locally on at least one region of interest.

16 Claims, 19 Drawing Sheets

U.S. PATENT DOCUMENTS

| | | | |
|---|---|---|---|
| 6,046,744 A * | 4/2000 | Hoppe | 345/419 |
| 6,933,940 B1 * | 8/2005 | Junkins et al. | 345/427 |
| 6,940,505 B1 * | 9/2005 | Savine et al. | 345/423 |
| 2003/0112240 A1 * | 6/2003 | Cerny | 345/428 |
| 2004/0075655 A1 * | 4/2004 | Dunnett | 345/418 |
| 2005/0062743 A1 * | 3/2005 | Marschner et al. | 345/473 |

OTHER PUBLICATIONS

"Optical Flow and Phase Portrait Methods for Environmental Satellite Image Sequences", I. Cohen et al., Proceedings of Fourth European Conferencec on Computer Vision, ECCV 96, Cambridge, U.K., Apr. 14-18, 1996, vol. 2, pp. 141-150.

"Scalable Image Coding with Fine Granularity Based on Hierarchical Mesh", P. Lechat et al., Proceedings of the Spie, Jan. 1999, pp. 1130-1142.

"Construction of Multiresolution Triangular B-spline Surfaces Using hexagonal Filters", A. Dreger et al., Proceedings Computer Graphics International, Hanover, Germany, Jun. 22-26, 1998, vol. 16, No. 6, pp. 339-356.

* cited by examiner

Silhouette

51

71

72

$$A = \begin{bmatrix} \frac{\alpha}{5+\alpha} & \frac{1}{5+\alpha} & \frac{1}{5+\alpha} & \frac{1}{5+\alpha} & \frac{1}{5+\alpha} & \frac{1}{5+\alpha} \\ \frac{1}{3} & \frac{1}{3} & \frac{1}{3} & 0 & 0 & 0 \\ \frac{1}{3} & 0 & \frac{1}{3} & \frac{1}{3} & 0 & 0 \\ \frac{1}{3} & 0 & 0 & \frac{1}{3} & \frac{1}{3} & 0 \\ \frac{1}{3} & 0 & 0 & 0 & \frac{1}{3} & \frac{1}{3} \\ \frac{1}{3} & \frac{1}{3} & 0 & 0 & 0 & \frac{1}{3} \end{bmatrix}$$

$$B = \begin{bmatrix} \frac{\alpha}{5+\alpha} & \frac{1}{5+\alpha} & \frac{1}{5+\alpha} & \frac{1}{5+\alpha} & \frac{1}{5+\alpha} & \frac{1}{5+\alpha} \\ \frac{1}{3} & \frac{1}{3} & 0 & 0 & 0 & \frac{1}{3} \\ \frac{1}{3} & \frac{1}{3} & \frac{1}{3} & 0 & 0 & 0 \\ \frac{1}{3} & 0 & \frac{1}{3} & \frac{1}{3} & 0 & 0 \\ \frac{1}{3} & 0 & 0 & \frac{1}{3} & \frac{1}{3} & 0 \\ \frac{1}{3} & 0 & 0 & 0 & \frac{1}{3} & \frac{1}{3} \end{bmatrix}$$

$$C = A * B$$

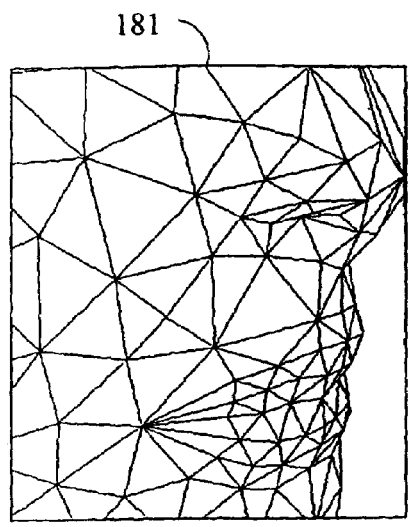
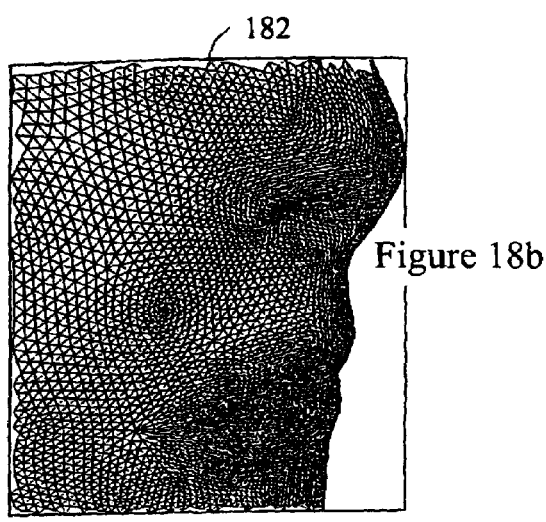
Figure 18a
Figure 18b
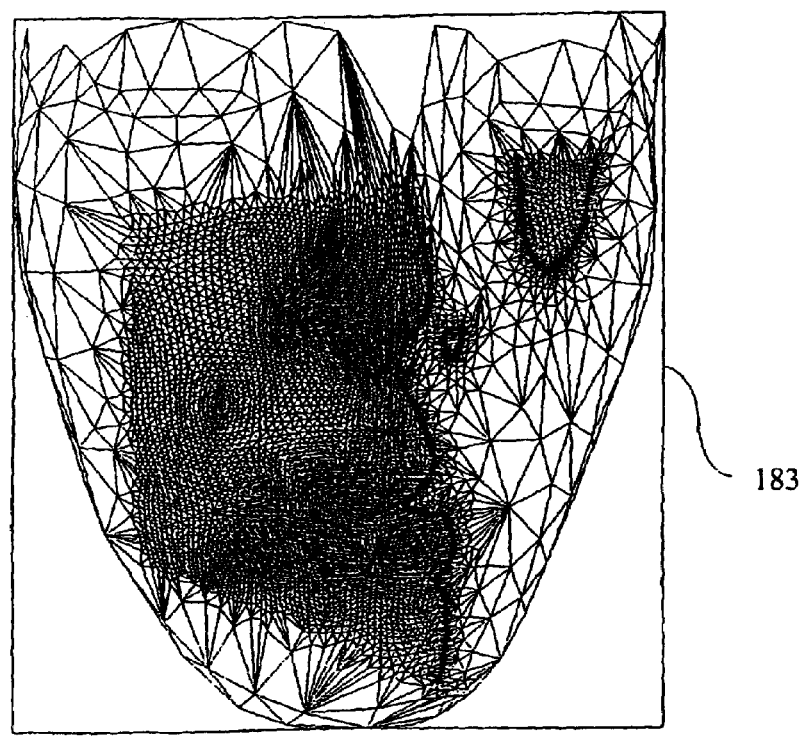
Figure 18c

REFINEMENT OF A TRIANGULAR MESH REPRESENTING A THREE-DIMENSIONAL OBJECT

CROSS-REFERENCE TO RELATED APPLICATION

This Application is a Section 371 National Stage Application of International Application No. PCT/FR01/01964 filed 21 Jun. 2001 and published as WO 01/99052 on 27 Dec. 2001, not in English.

FIELD OF THE INVENTION

The field of this invention is image processing. More precisely, the invention relates to the processing of images produced from polygonal meshes, and particularly triangular meshes. More precisely again, the invention relates to the refinement of triangular or triangularised meshes representing objects in three dimensions.

The invention can be used to develop high added value services and sophisticated man machine interfaces. Its applications include particularly transmission of interactive contents, remote shopping, cultural applications, games and/or cooperative work.

BACKGROUND OF THE INVENTION

Meshes more and more frequently provide the support for representing objects, particularly in a virtual reality scene. They thus represent most information describing such a scene. Conventionally, a mesh is defined by a set of vertices and faces (or a set of vertices, edges and orientations) defining a topology.

A large number of image compression techniques are known to reduce the quantity of data necessary to represent an image or a sequence of animated images. The objective is particularly to reduce digital signal rates, in order to transmit the signals and/or to store them on a data support.

At the same time, the image or the sequence of images displayed on a destination terminal must be of the best possible quality, or at least of a predetermined quality level.

It is therefore particularly important to improve the perceptual quality of images produced from meshes while minimizing the quantity of information produced.

The invention is particularly, but not exclusively, applicable to the display of images on a terminal, or the display of objects making up a three-dimensional scene during a progressive transmission.

The invention is equally applicable to any type of polygonal mesh connected to image or video type data that can be triangulated.

Subdivision surfaces are more and more frequently used in the field of graphics data processing due to their excellent efficiency in improving the rendering of curved surfaces, coding, transmission and modelling of images.

The techniques for subdivision of surfaces defined by triangular meshes are described particularly in the SIG-GRAPH 99 document ("Subdivision for Modelling and Animation" by Denis Zorin). Triangular meshes can then be refined by interpolation, which keeps the vertices of the original mesh while generating a surface with a $C^1$-differentiability (Dyn, Levin and Gregory, "A butterfly subdivision scheme for surface interpolation with tension control", ACM Transactions on Graphics 9, 2 (April 90), 160–169), or by approximation.

Loop ("Smooth Surface Subdivision based on Triangles", University of Utah, Department of Mathematics, Master's Thesis, 1987) proposed a method for generating triangular meshes by global 1 to 4 subdivision, in 1987. The surface thus obtained then has a $C^2$-differentiability on each of its vertices, except on extraordinary vertices in the original mesh that have a $C^1$-differentiability (an ordinary vertex is defined as being a vertex with a valence equal to 6, and an extraordinary vertex of a triangular mesh is defined as being a vertex with a valence not equal to 6).

Subsequently, Hoppe (Hoppe et al., "Piecewise Smooth Surface Reconstruction", SIGGRAPH 94 Conference Proceedings) developed an adaptive version of the method proposed by Loop, in 1994. Use of this technique can produce a surface that keeps and reconstructs geometric singularities such as sharp edges, corners and pointed tips of objects. The result is a piecewise smooth surface with continuity on curves forming the sharp edges, while providing differentiability on surface elements making up the mesh.

A disadvantage of these techniques according to prior art is that it is impossible to use them to adapt the image to the view point of a virtual observer. In particular, these techniques cannot use silhouettes (in this case silhouette means all edges of the mesh sharing two faces, one of which is oriented facing a virtual camera, and the other is in the opposite direction), the pyramid of vision and the orientation of the faces of objects facing a camera or the eye of an observer. The main result is "overcoding" of areas that are only slightly visible or are not visible at all, or are less relevant, to the detriment of visually important areas.

Another disadvantage of these techniques according to prior art is that they cannot enable different detail levels to cohabit on a triangular mesh representing an object.

Another disadvantage of these techniques according to prior art is that they make it impossible to optimise the ratio of the perceptual quality to the required information quantity (in other words, for example, the number of triangles necessary to display an image on a graphic terminal.).

Another disadvantage of most of these techniques is that they use a 1 to 4 subdivision operator. This type of operator has a multiplication factor of 4, which limits the harmonious cohabitation of different detail densities within the image, and generates coarse pixelisation. Furthermore, these techniques very quickly become expensive in memory if it is required to improve the pixelisation of the object.

In particular, the purpose of the invention is to overcome these disadvantages according to prior art.

More precisely, one purpose of the invention is to provide a process for a visually continuous refinement of triangular meshes.

Another purpose of the invention is to implement a process for refinement of triangular meshes depending on the view point of a virtual observer.

Another purpose of the invention is to provide a process for refinement of triangular meshes that optimises the ratio of the perceptual quality to the information quantity.

Another purpose of the invention is to implement a process for refinement of triangular meshes that is particularly suitable for curved surfaces.

Another purpose of the invention is to provide a process for refinement of triangular meshes adapted to surfaces comprising angular areas to be kept, and to preserve geometric singularities such as corners or sharp edges.

Another purpose of the invention is to implement a fast, robust and reversible process for refinement of triangular meshes.

Another purpose of the invention is to provide a process for refinement of triangular meshes that is simple and inexpensive to implement.

Another purpose of the invention is to implement a process for refinement of triangular meshes that can be adapted to the terminal on which the image or sequence of images is synthesized and then displayed.

Another purpose of the invention is to provide a process for refinement of triangular meshes that can give a refined grid.

Another purpose of the invention is to implement a process for refinement of triangular meshes to obtain harmonious cohabitation of different levels of detail within the displayed image.

BRIEF SUMMARY OF THE INVENTION

These objectives, and others that will become clear later, are achieved using a process for refinement of a triangular mesh representing a three-dimensional (3D) object, the said mesh being composed of a arrangement of vertices and triangular faces, each being defined by three references to the vertices that it connects, and with three edges connecting each of the said vertices.

According to the invention, this process comprises a step for selection of at least one region of interest, the said mesh refinement being made locally on the said at least one region of interest.

Thus, the invention is based on a quite innovative and inventive approach to the refinement of a triangular mesh representing an object in three dimensions. The invention is based particularly on the application of a refinement localized on perceptually relevant regions of objects, rather than on a global refinement of the entire mesh. This type of localization of the refinement on specific regions of interest is a means of optimising the ratio of the perceptual quality to the quantity of information produced, since only perceptually important regions are treated in detail.

Advantageously, this type of process according to the invention also comprises a hybrid subdivision step of at least one of the said triangular faces applying a 1-to-3 centre of gravity subdivision operation, so as to divide each of the said faces into three triangular faces by the addition of a vertex.

A 1-to-3 subdivision introduces a multiplication factor lower than factors with techniques according to prior art (usually 4) and thus gives a finer pixelisation of the images. The memory cost, evaluated as a number of triangles necessary to build the mesh, is also smaller and increases less quickly than with a 1 to 4 subdivision operator.

According to a first advantageous characteristic of the invention, this type of process also comprises a step to swap the edges of at least some of the said subdivided triangular faces, consisting of eliminating each edge of the triangular face before the subdivision and replacing it by an edge connecting the added vertex to the vertex opposite the deleted edge of the adjacent triangular face.

The use of an edge swapping operation, combined with the 1-to-3 centre of gravity subdivision, actually gives a harmonious cohabitation of the different detail levels induced by carrying out a local refinement of the mesh. Furthermore, since the 1-to-3 triangular subdivision increments the valence of the vertices of the original mesh (in other words the number of edges reaching the vertices), the edge swapping operation simultaneously avoids degeneration of the triangles making up the mesh.

Preferably, the said selection step is implemented by an operator and/or according to a predetermined detection criterion.

Regions of interests may be explicitly defined by an operator (in other words a user of the terminal on which the source image is displayed, or for example a graphics data processing operator) and/or deduced from a phase that detects regions considered to be visually relevant, for example such as regions with high illumination gradient, or silhouettes.

Advantageously, when the said selection step is implemented according to a predetermined detection criterion, the said at least one region of interest belongs to the group comprising:

triangular faces located inside a pyramid of vision defined by the eye of an observer and a display window;

triangular faces facing the eye of an observer;

triangular faces adjacent to a set of edges each sharing two triangular faces, a first face being oriented towards the observer's eye, and a second face being oriented in the opposite direction;

triangular faces belonging to animated areas of the said object (the lips of a virtual clone, the eyebrows when mimicking a person, etc.).

Thus, selected regions of interest are regions considered to be visually relevant for a person observing the mesh. It may seem pointless to refine areas of the mesh that are not visible or only slightly visible to the user, from the current view point. Selected regions of interest may also be silhouettes of observed objects, which play a preferred role in cognitive processes. It is particularly important to refine curved surfaces of the silhouette of the object which appear in polygonal form when they are described too briefly by a mesh network.

Regions of interest may also be animated regions of the displayed object, since an observer will preferentially look at such regions.

According to a second advantageous characteristic of the invention, this process also comprises a step to filter the position before subdivision of at least some of the said vertices of the mesh.

This type of filtering of the mesh geometry is also a means of obtaining $C^2$ type differential constraints on the region of interest obtained after an infinite number of 1-to-3 triangular subdivisions. In particular it smoothes the silhouettes of refined objects.

According to one advantageous technique, the said step to filter the position before subdivision of a mesh vertex takes account of the valence of the said vertex and the valence of its adjacent vertices, the valence being the number of edges reaching a vertex.

According to a preferred embodiment of the invention, the said filter step uses a calculation of weighting coefficients for each valence, obtained by an analysis of the asymptotic behaviour of a stochastic global subdivision matrix.

Advantageously, this type of process according to the invention implements at least one constraint to prohibit implementation of the said subdivision step on a given face and/or the said swapping step on a given edge and/or the said filter step on a given vertex.

It may be desirable to add constraints on the surface of the observed object if it is considered that some regions of the image must not be modified. In particular, it may be desirable to keep geometric singularities of the objects, for example such as corners or sharp edges.

According to one advantageous embodiment of the invention, the said at least one constraint is a means of prohibiting the implementation of a step belonging to the group comprising:

a step to swap a sharp edge;
a step to filter the position of a vertex forming a corner;
a step to subdivide a triangular face located on a plane region of the said object (in this case the refinement is pointless).

Preventing subdivision of a triangular face located on a plane region of the object avoids expensive and pointless operations, while giving priority to perceptual reproduction.

One way of implementing these various constraints would be to precede the refinement process according to the invention by a preliminary phase to detect the corresponding geometric singularities.

According to a preferred embodiment of the invention, a process of this type implements a step for smoothing at least one sharp edge, consisting of interlacing a process for approximating a curve with a process for approximating surfaces, implementing a process to subdivide the said sharp edge and/or a filter operation.

This type of smoothing operation can attenuate the polygonal appearance of sharp edges when they are described by a mesh network that is too coarse, and therefore improve the perceptual quality of the image.

Preferably, this type of process also includes a step to interpolate normals and/or the positions of vertices between the initial and final positions of the said added vertices.

This gives a refinement continuity made without any visual artefacts or sudden modifications of the geometry of the surfaces of the object being considered. Therefore an observer sees a visually continuous refinement of the image displayed on the screen of his terminal.

The invention also relates to a triangular mesh representing an object in three dimensions obtained according to a refinement process like that described above, and applications of such a process.

The invention also relates to a system for transmission of a triangular mesh, and a triangular mesh decoding device, and a display terminal to represent the object in three dimensions.

The invention also relates to a process for refinement of the coding of an image, comprising a step for the selection of at least one silhouette of the said image, the said refinement of the coding of the said image being made locally on the said at least one silhouette.

BRIEF DESCRIPTION OF THE DRAWINGS

Other characteristics and advantages of the invention will be understood more clearly upon reading the following description of a preferred embodiment, given solely for illustrative purposes and that is in no way limitative, accompanied by the appended figures wherein:

FIGS. 18a to 18c present the results obtained by implementation of the process according to the invention for refinement of a mesh representing a face;

DETAILED DESCRIPTION OF PREFERRED EMBODIMENTS

The general principle of the invention is based on a local adaptive refinement of triangular meshes, making use of a local mesh subdivision technique combined with filtering of vertex positions.

Figure 1:
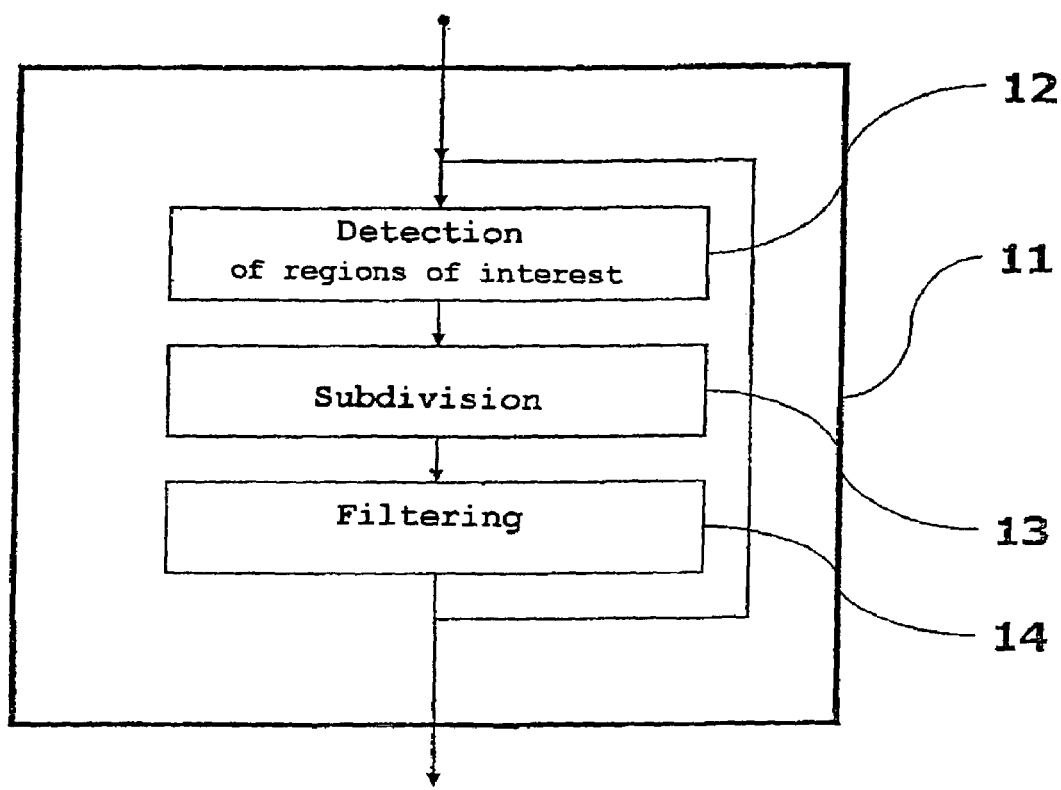
FIG. 1 shows a block diagram of the different steps applied during the process for refinement of triangular meshes according to the invention.

We will now present an embodiment of such a refinement process according to the invention, with reference to FIG. 1.

The technique used according to the invention makes iterative use of a generic adaptive refinement algorithm 11 comprising 4 main steps:

a step not shown for reception of an object broken down into a mesh, for example according to a technique similar to that described in French patent application FR 9907608 in the name of the same holders as the holder of this patent application, entitled "Coding process for a mesh by conquest on edges, with preference to a complete vertex as pivot, and the corresponding decoding process";

a step referenced 12 for the detection of at least one region of interest, for example dependent on a view point;

a hybrid subdivision step referenced 13 of at least some faces of the triangular mesh;

an adaptive filter step referenced 14, to filter the mesh geometry.

The user can explicitly define step 12 to detect at least one region of interest of the source image (for example a region of the image in which it is interesting to zoom) or step 12 can be deduced from a phase to detect regions considered to be visually relevant within the source image.

Figure 3A:
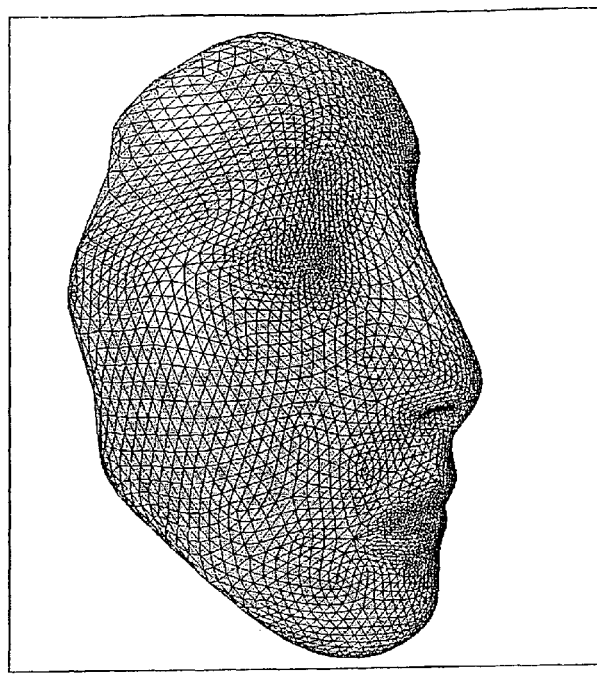
FIGS. 3a and 3b describe a first selection criterion for refined regions of interest according to the process in FIG. 1.

This type of detection phase necessitates the introduction of a view point 31 illustrated in FIG. 3a. This type of view point 31 may bet a virtual camera, for example defined by its centre, and a pyramid of vision formed by the eye of an observer and the image display window.

Figure 2:
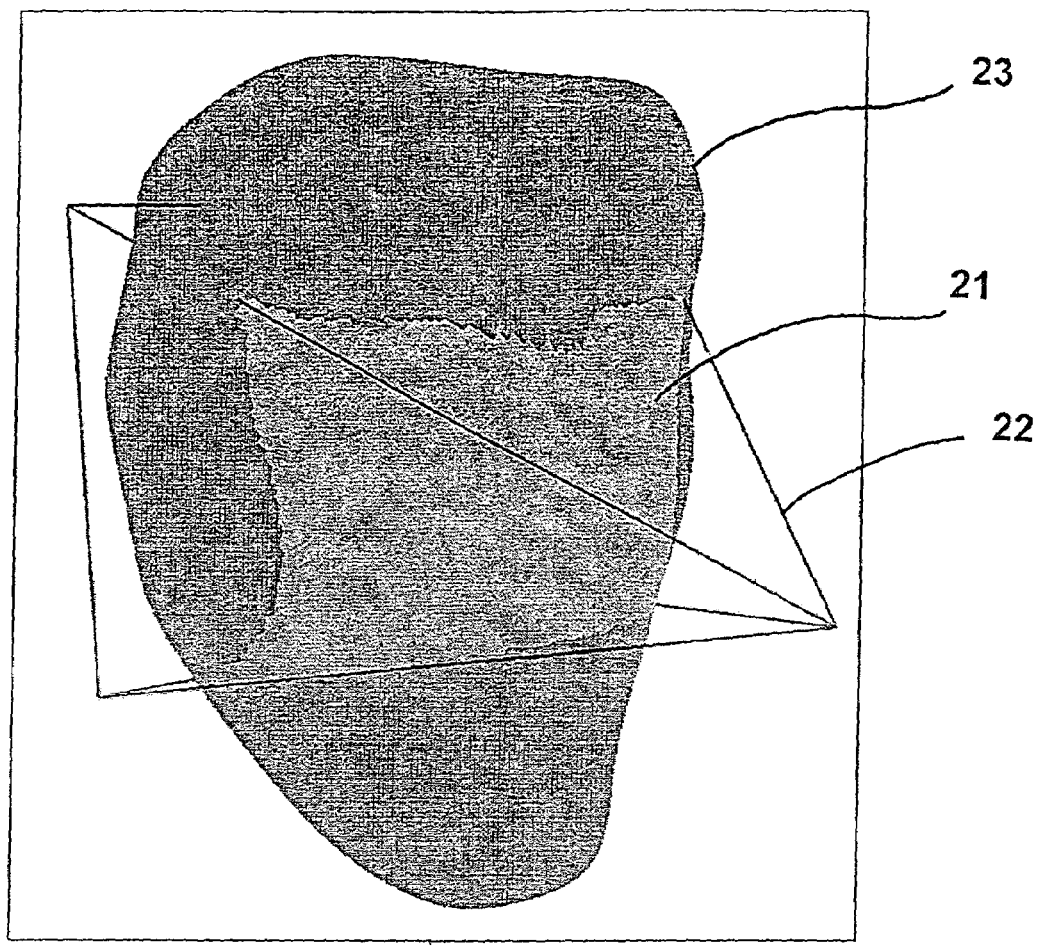
FIG. 2 illustrates an example pyramid of vision used to determine visually relevant regions that can be refined according to the process in FIG. 1.
Figure 3B:
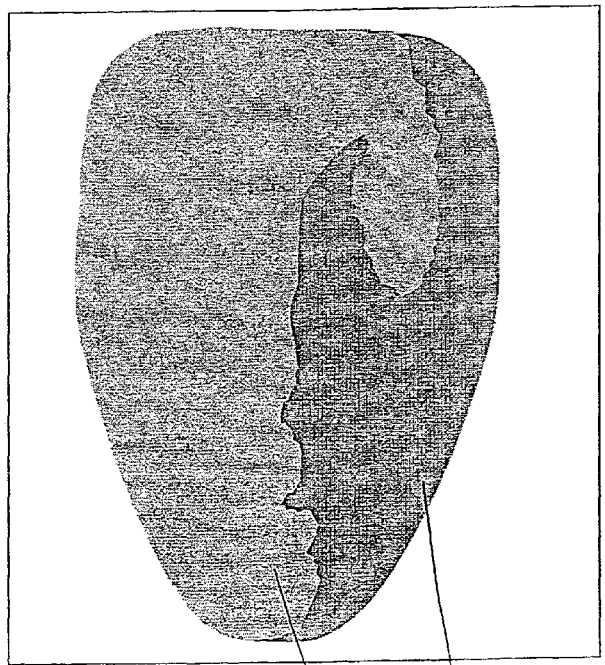

When the view point 31 has been defined, the regions of interest may then be selected from among the following regions of the source image;

the faces 21 of the mesh of the image 23 located inside the pyramid of vision 22 shown in FIG. 2;

the faces 32 oriented facing the camera or the view point 31, the other faces 33 not being visible to the user, by convention with the graphics data processing operators responsible for processing of the source image (these faces are illustrated in FIG. 3);

faces belonging to the silhouette of the displayed object.

Figure 4:
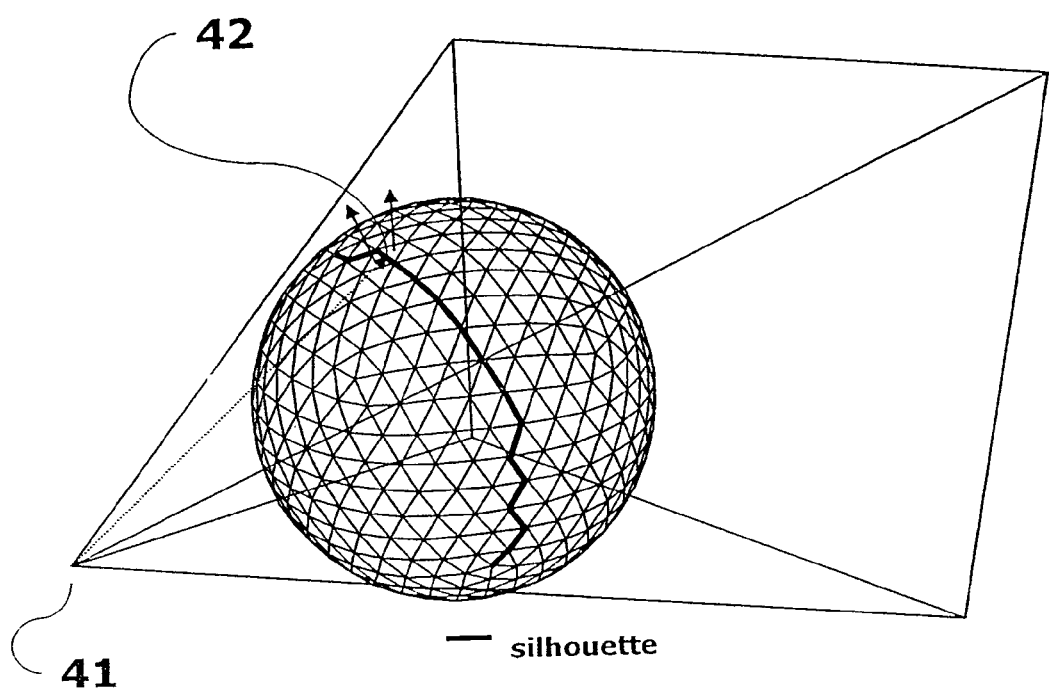
FIG. 4 presents the conventional definition of a silhouette.

A conventional definition of the silhouette of an object is illustrated in FIG. 4. The object represented here is a sphere, displayed using a camera 41. An edge of the mesh representing the sphere belongs to the silhouette 42 if it shares two faces, one of which is oriented to face the camera 41, and the other is in the opposite orientation.

Figure 5A:
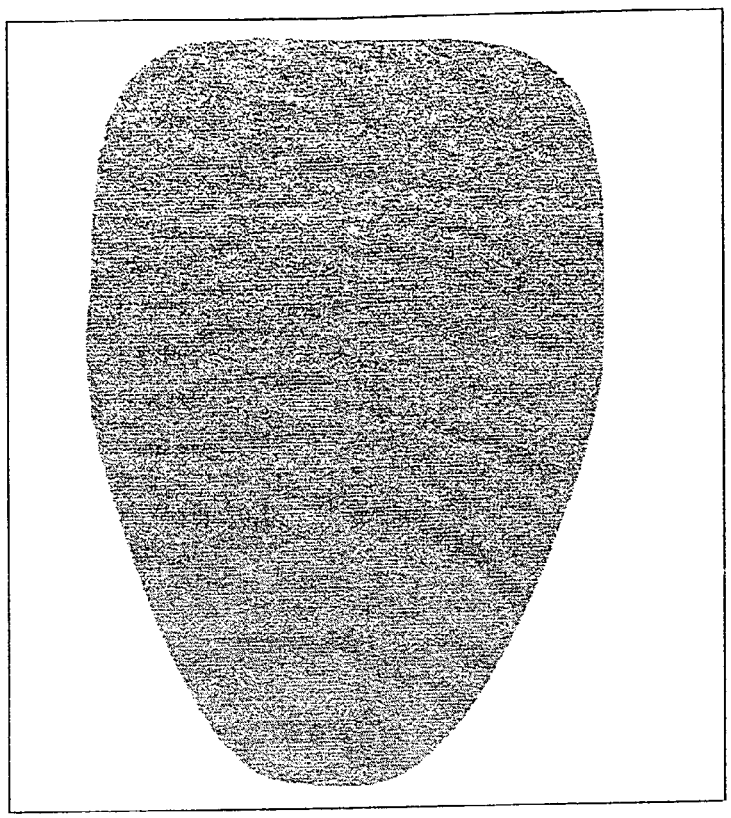
FIGS. 5a and 5b illustrate an extended definition of the silhouette presented in FIG. 4.
Figure 5B:
Figure 5B:
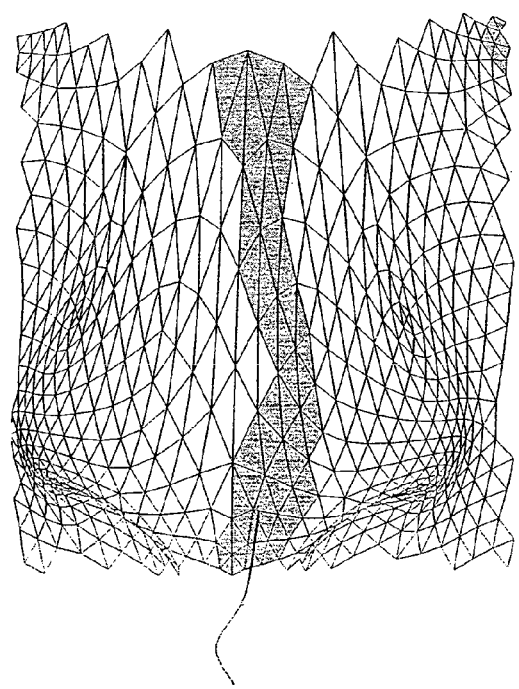

FIGS. 5a and 5b present a broader definition of the silhouette of an object. In particular, FIG. 5b shows a detail of the silhouette illustrated in FIG. 5a. In this case, and throughout the rest of this document, silhouette means the strip of triangles 51 adjacent to the subset of edges forming the silhouette of the mesh (in the conventional meaning as used in the previous paragraph) for the current view point.

Figure 6:
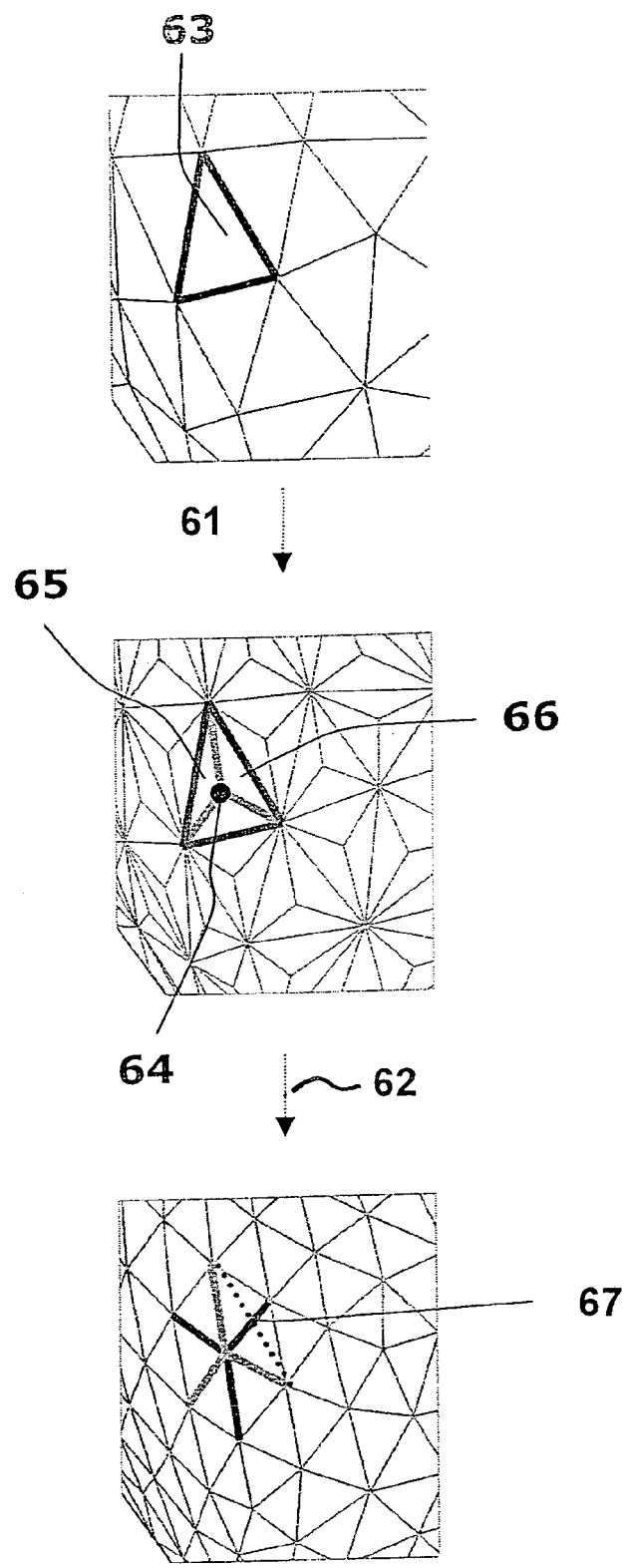
FIG. 6 shows an example of a hybrid subdivision and swapping of the edges of one face of a triangular mesh according to the process illustrated in FIG. 1.

After selecting a region of interest during the step reference 12, a hybrid subdivision 13 is made on the faces of the mesh included within the selected region of interest. This type of subdivision is illustrated on FIG. 6.

The mesh is refined iteratively by a 1-to-3 subdivision 61 of its elements and by swapping 62 the edges of the original mesh, to avoid the degeneration of triangles making up the mesh. The effect of the one to three triangular subdivision is to increment the valence of the vertices in the original mesh, in other words the number of edges reaching the vertices of the mesh, and the swap 62 thus alleviates degeneration of the mesh.

Therefore, one face 63 is subdivided into three faces by inserting a vertex 64 at its centre, and by creating two new faces 65 and 66.

A swap is then done by deleting the edges of the face 63 before the subdivision and creating three new edges 67 that join the inserted vertex 64 to the vertices of the faces adjacent to the face 63 opposite the deleted edges.

At the end of the subdivision step 13, a step 14 is applied for adaptive filtering of the mesh geometry.

Figure 7A:
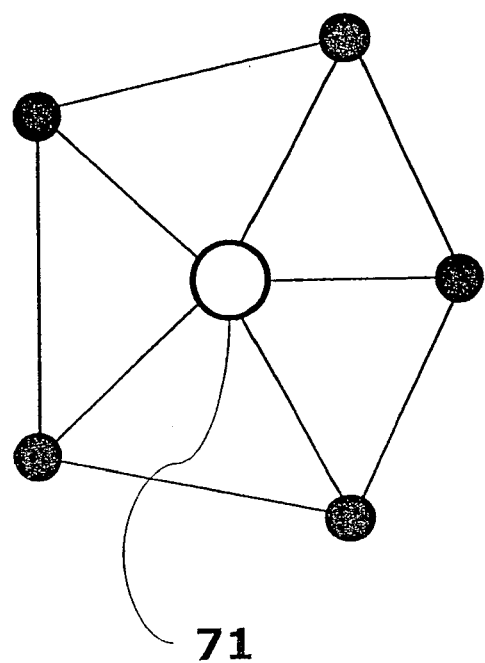
FIGS. 7 to 10 describe an example embodiment of position filtering before subdivision of a vertex of the triangular mesh with valence 5 (for example)
Figure 7B:
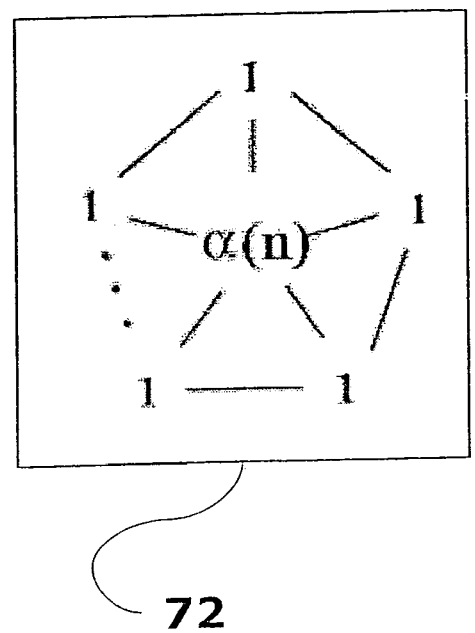

This type of adaptive filter step 14 consists of positioning the vertices of the original mesh, in each subdivision step 13, so as to obtain type $C^1$ or $C^2$ differential constraints that can be differentiated over the region of interest obtained after an infinity of subdivisions. For example, according to FIG. 7a, the new position of the vertex 71 with valence 5 is deduced from its initial position and the position of its five adjacent vertices in the initial mesh using the filter coefficients 72 illustrated in FIG. 7b. In other words, the position of a given vertex 71 is recalculated by summating the weighted positions of its adjacent vertices and itself. Thus, in FIG. 7b, n represents the valence of vertex 71, and $\alpha(n)$ corresponds to the weighting coefficient used.

Figures 8A, 8B:
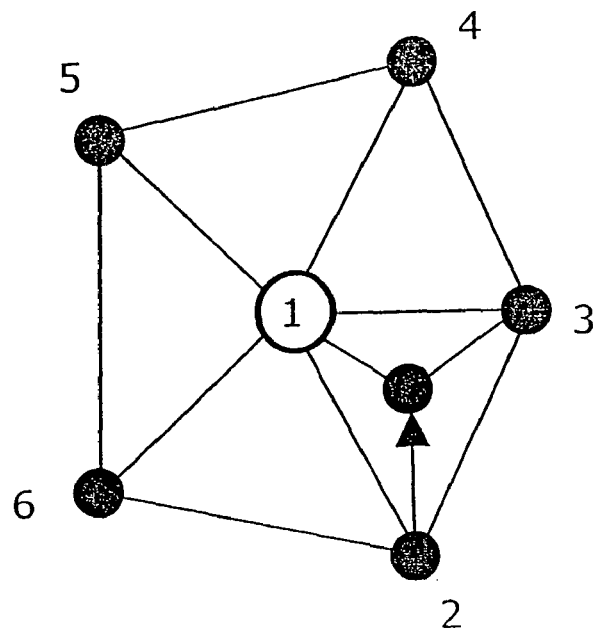
Figures 9A, 9B:
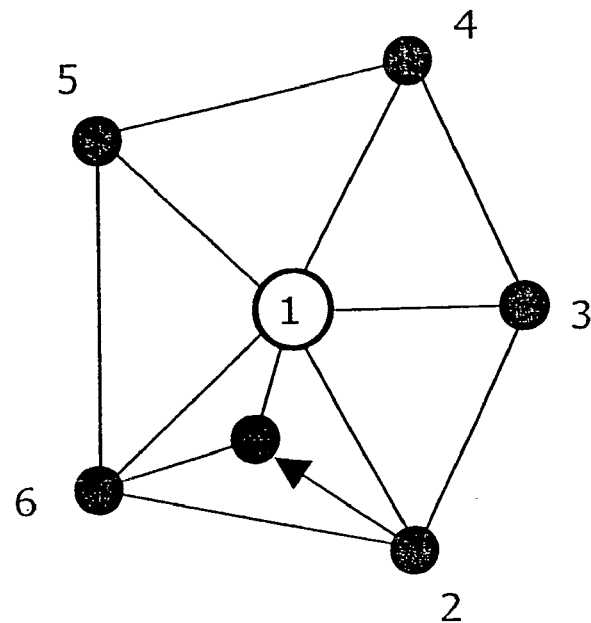
Figure 10:
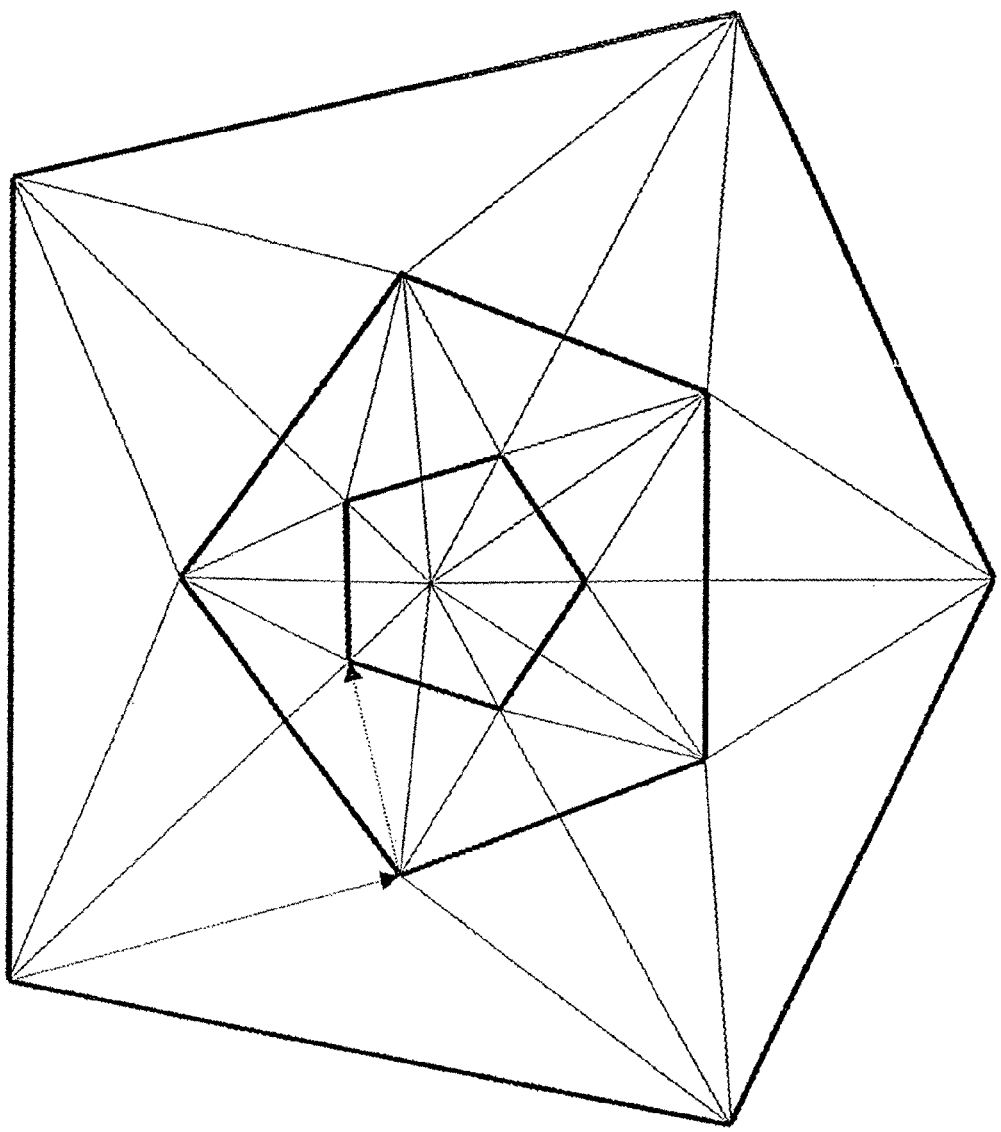

The weighting coefficients $\alpha(n)$ for each valence n are calculated by analysing the asymptotic behaviour of a stochastic global subdivision matrix C obtained by numbering the vertices and the matrix expression of two successive 1-to-3 subdivision iterations with inverse orientations shown in FIGS. 8a and 9a. This expression is formally defined by the creation of two matrices A and B illustrated on FIGS. 8b and 9b respectively. The matrices A, B and C are thus related by the relation C=A*B in accordance with FIG. 10. The multiple eigenvalues of the matrix C are then obtained in symbolic form, and the differential constraints searched for in the region of interest are obtained by solving the equation $\lambda_1^2 = \lambda_3$ (where $\lambda_1$ and $\lambda_3$ are the eigenvalues of C) after putting the eigenvalues into decreasing order as described by Hartmut Prautzsch in the document "Smoothness of subdivision surfaces at extraordinary points", Adv. In Comp. Math., pages 377–390, vol. 9, 1998).

The following pseudo-code describes the hybrid subdivision process including filtering of a region of interest in a mesh M:

M: mesh with F faces and S vertices.
Let F' (F'<=F) be the number of faces to be subdivided
One to Three Subdivision:
For (F' iterations)

```
{
    f: current face to be subdivided composed of the
ordered triplet {s1;s2;s3}
        add a vertex s at the centre of face f
        mark the vertices s1, s2 and s3 to be filtered
        add a face f1 formed by the triplet {s2;s3;s}
        add a face f2 formed by the triplet {s3;s1;s}
        modify the face f, now formed by the triplet
{s1;s2;s}
        update adjacent vertices / faces and faces / faces
        calculate normals to vertices
        calculate normals to faces
        mark faces f, f1 and f2 for which the edges are to
be swapped
}
```

The mesh now comprises F"=F+2*F' faces
Filter the Positions:
Count the vertices to be filtered
Temp: temporary storage structure for the new positions
while (there are any vertices to be repositioned)

```
{
    s: current vertex to be repositioned
    n: valence of the vertex s memorized before the
one-to-three subdivision
    p: calculate the new position of the vertex s
starting from the coefficient α(n) of the positions of
s and its adjacent vertices
        store p in the temporary structure temp
}
``` while (there are any vertices to be repositioned)

```
{
    s: current vertex to be repositioned
    apply the new position p to the current vertex
}
```

Swap the Edges:
while (there are any faces with an edge to be swapped)

```
{
    f: current face for which the edges are likely to
be swapped
        for (each face f' adjacent to f not marked)
            if (f' was obtained by one-to-three subdivision)
                swap the edge separating f and f' by
```

-continued

```
        exchanging the vertices
           mark the face f
    }
``` recalculate the normals of M per face
recalculate the normals of M per vertex

Figure 11A:
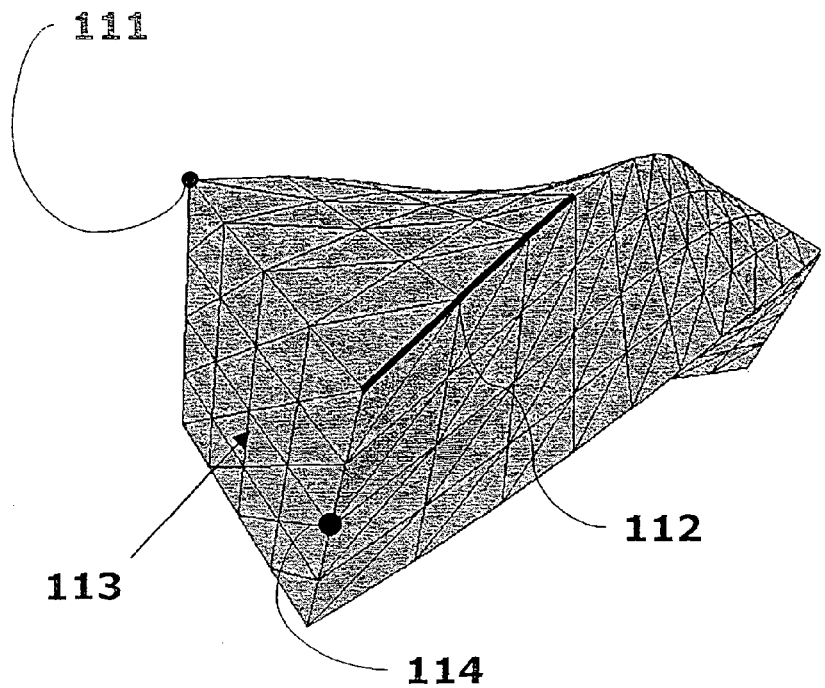
FIGS. 11a and 11b illustrate the addition of constraints to prevent the implementation of some steps of the refinement process in FIG. 1.

When it is required that some regions of the object should not be modified during the different steps in the refinement process according to the invention, some constraints can be added on the surface of the object considered, as illustrated in FIG. 11a.

Figure 11B:
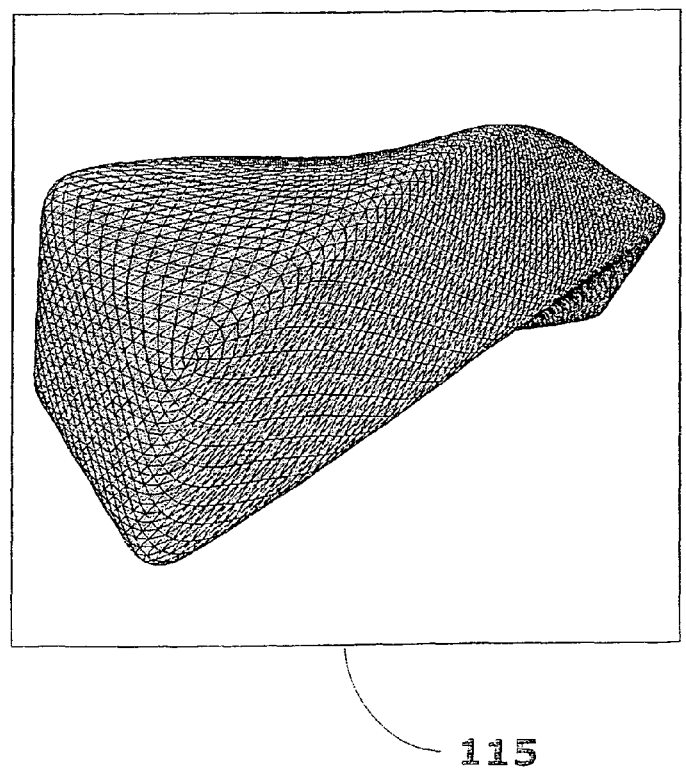

Thus, it may be required to keep the sharp edges 112 and the corners 111 in order to obtain a representation of the object considered that is closer to reality than the mesh 115 in FIG. 11b in which the sharp edges 112 and the corners 111 have been deleted. In this drawing, the edges, vertices and faces that are not to be swapped, displaced or subdivided must be marked.

The refinement process may thus be preceded by a preliminary phase (interactive or automatic) to detect corners, sharp edges or plane regions.

For example, we could prohibit:
swapping of sharp edges 112;
moving vertices 111 forming the corners of the mesh;
subdivision of faces 113 located on a plane region of the mesh.

This type of subdivision is pointless and does not refine the mesh considered.

It may also be desirable to refine a mesh by smoothing a sharp edge 112 in its own direction, in order to-obtain a curve with a less polygonal appearance. The curve formed by the vertices classified on a regular sharp edge can then be interpolated, such as the vertex 114. Therefore, a curve approximation process (namely the regular sharp edge considered to which the vertex 114 belongs) is interlaced with a surface approximation.

This smoothing operation of a sharp edge is described in more detail with reference to FIGS. 12 and 13a to 13c. This type of operation requires the use of a subdivision operator of the regular sharp edge 121 and a filter operator.

Figure 12:
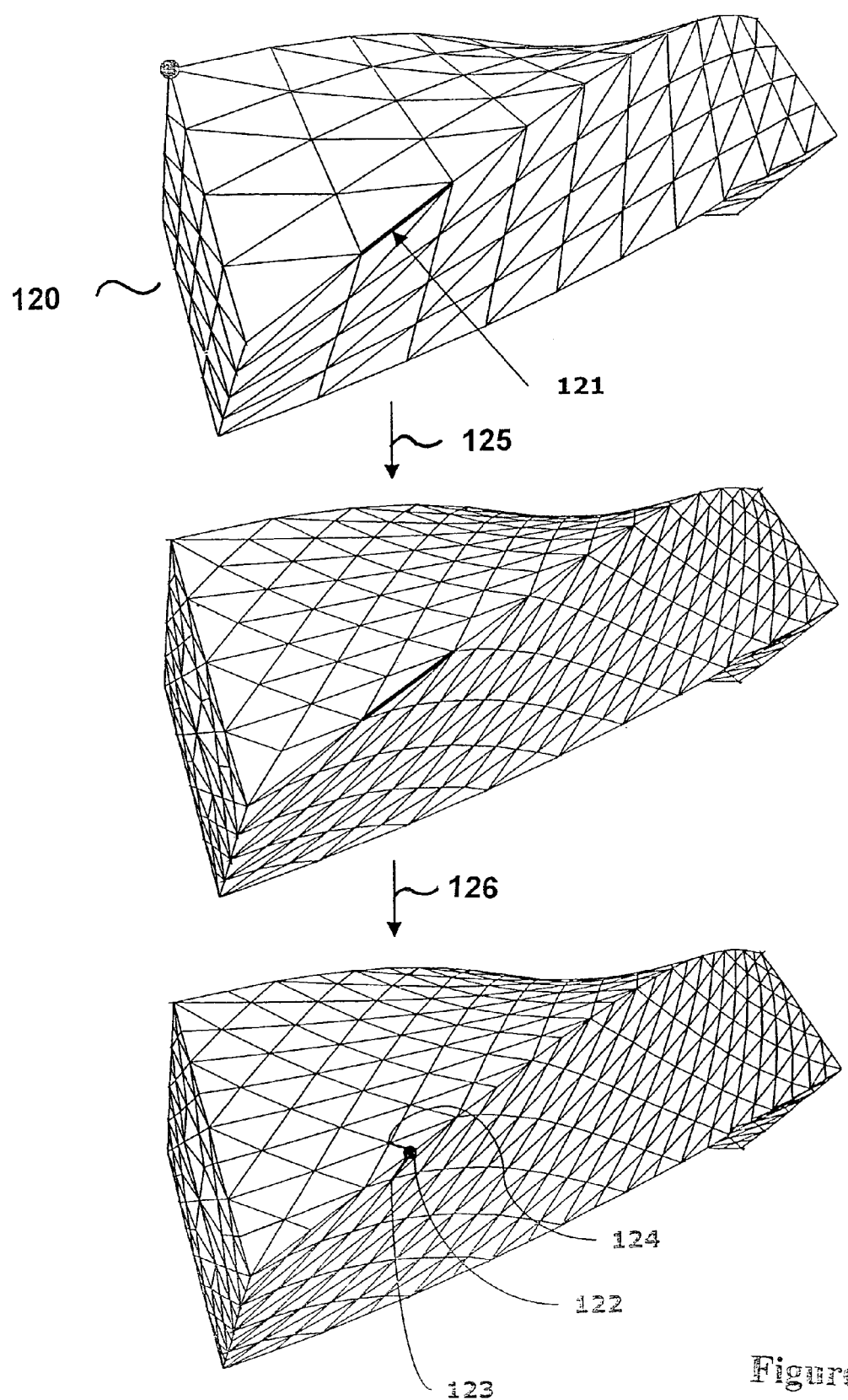
FIGS. 12 and 13 present an example embodiment of a smoothing step of a sharp edge.
Figure 13A:
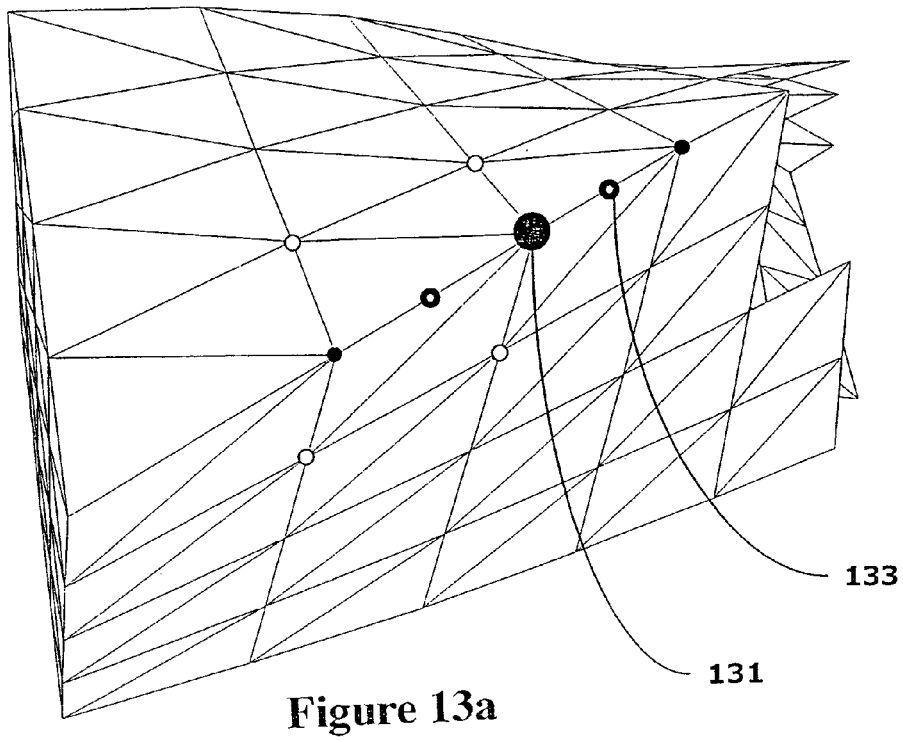
Figure 13B:
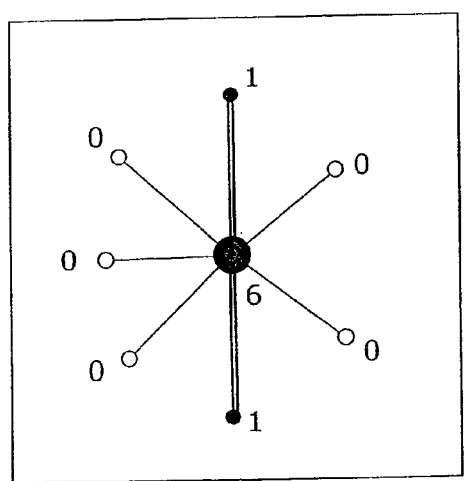
Figure 13C:
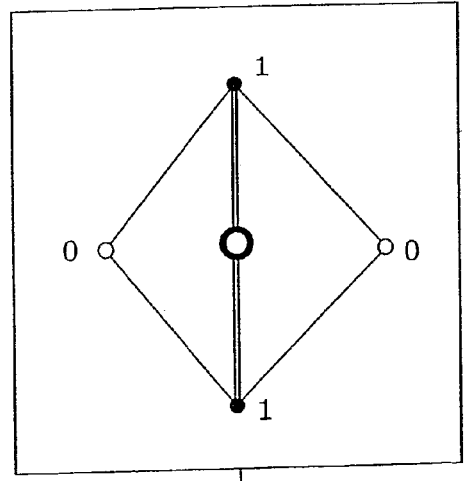

Consider the triangular mesh 120 in FIG. 12. A one-to-three subdivision of the mesh 120 is carried out during a step referenced 125, together with swapping of the edges using a technique similar to that described previously in this document. Note that a constraint is applied to the sharp edge 121 to prevent it from being swapped as the mesh is refined.

The next step referenced 126 is to make a centre of gravity subdivision of the regular sharp edge 121 by inserting a vertex 122 and two regularization edges 123 and 124. Thus, a vertex 131 illustrated in FIG. 13a belonging to a regular sharp edge (therefore with two adjacent sharp edges) is positioned according to the weighting mask 132 shown in FIG. 13b, whereas the new vertex 133 inserted on the sharp edge is positioned according to the weighting mask 134 in FIG. 13c, in other words at the middle of the edge before the vertices in the original mesh are displaced.

The result is a smoothing effect of the sharp edges which gives a less polygonal appearance.

It is also very important that refinement of the mesh representing the object considered should be done without any visual artefacts or sudden modifications to the surface geometry, so that it is not perceptible, or is only slightly perceptible, for an observer viewing the object on an appropriate terminal. In particular, the hybrid subdivision combined with filtering of the mesh geometry must be made in a visually continuous manner.

In the embodiment described in the remainder of the document, refinement continuity is obtained by joint interpolation of the geometry of the mesh and normals with time, as illustrated in FIGS. 14a, 14b, 15 and 16.

Figure 14A:
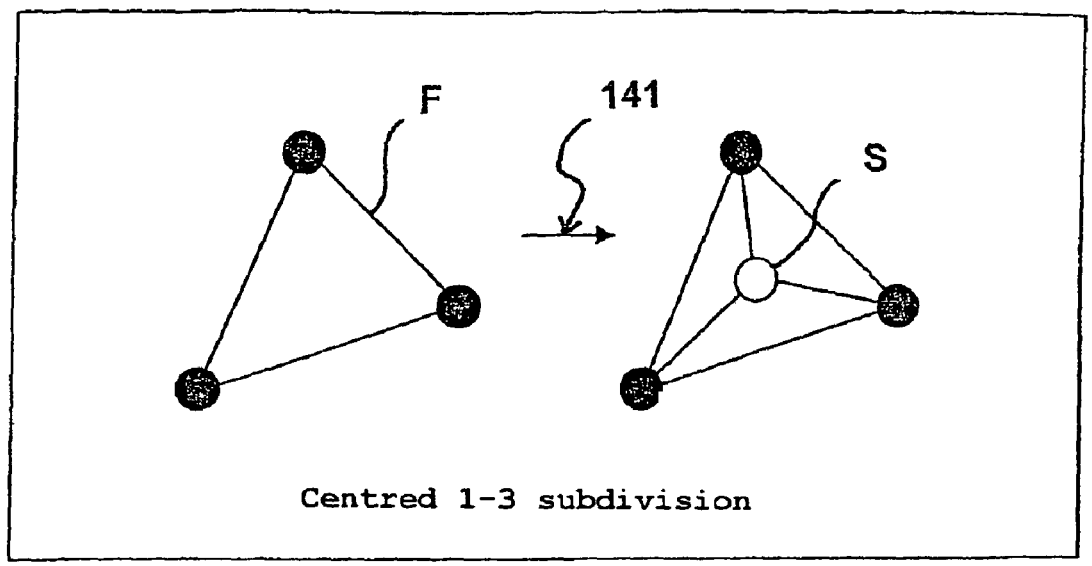
FIGS. 14a and 14b illustrate example embodiments of a centred 1-to-3 subdivision, and a geometric interpolation of the position of vertices in the mesh, respectively.

According to the invention, the hybrid subdivision takes place in three steps:
a centred one-to-three subdivision 141, illustrated in FIG. 14a;
filtering of the positions;
swapping of the edges.

Figure 14B:
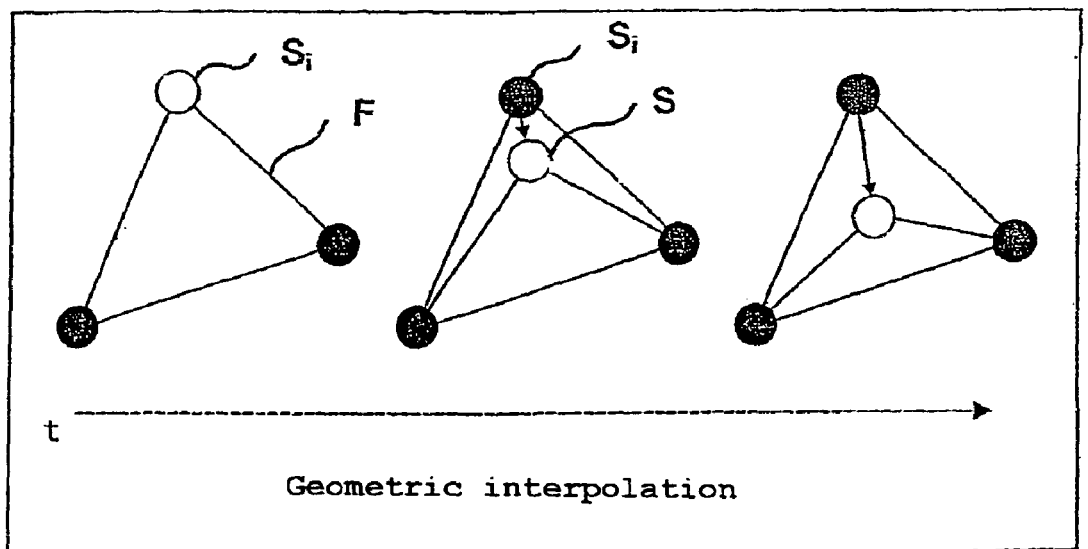

Thus according to FIG. 14b, inserting a vertex S at the centre of a face F consists of inserting a vertex S by superposing it on one of the three vertices of the face F considered, called $S_i$, and chosen arbitrarily, and creating two new corresponding faces. The geometric interpolation is then made by linear interpolation 142 between the initial and final positions of the vertex S, and between the initial position of the vertices of the original mesh, and the final position of the vertices of the original mesh after filtering.

Figure 15:
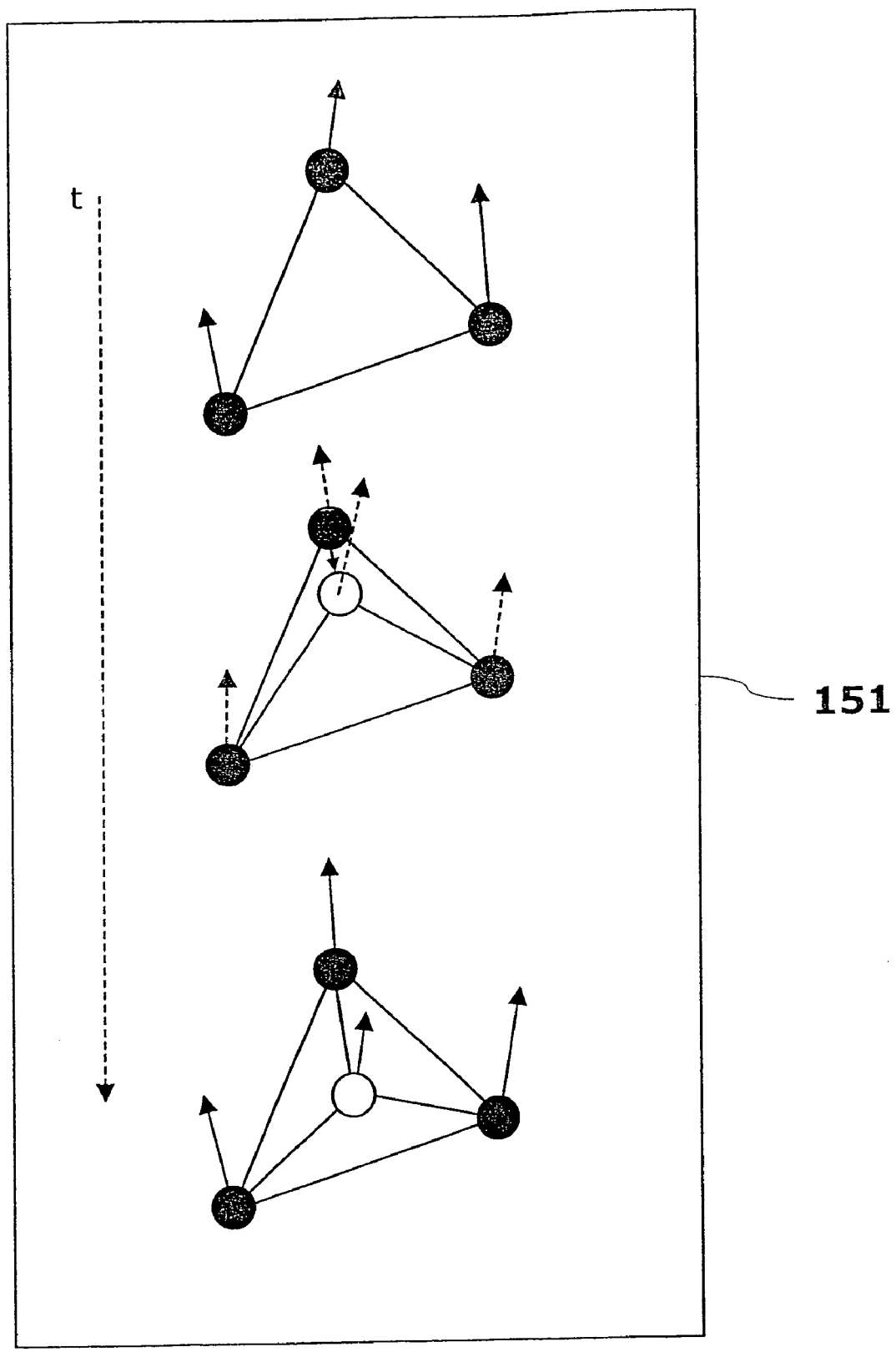
FIG. 15 presents an example embodiment of an interpolation of normals during the twofold subdivision/filtering operation.

This interpolation is made at the same time as the normals 151 of the vertices located in the region concerned by the subdivision are interpolated, the vertex S initially inheriting the normal at the vertex $S_i$. This type of operation to interpolate normals is illustrated in FIG. 15, and requires that normals are calculated after simulating the twofold subdivision/filtering operation.

Normals may be interpolated in a linear form. Obviously, the interpolation may be done in any other appropriate form, for example such as interpolation on the unit sphere.

Figure 16:
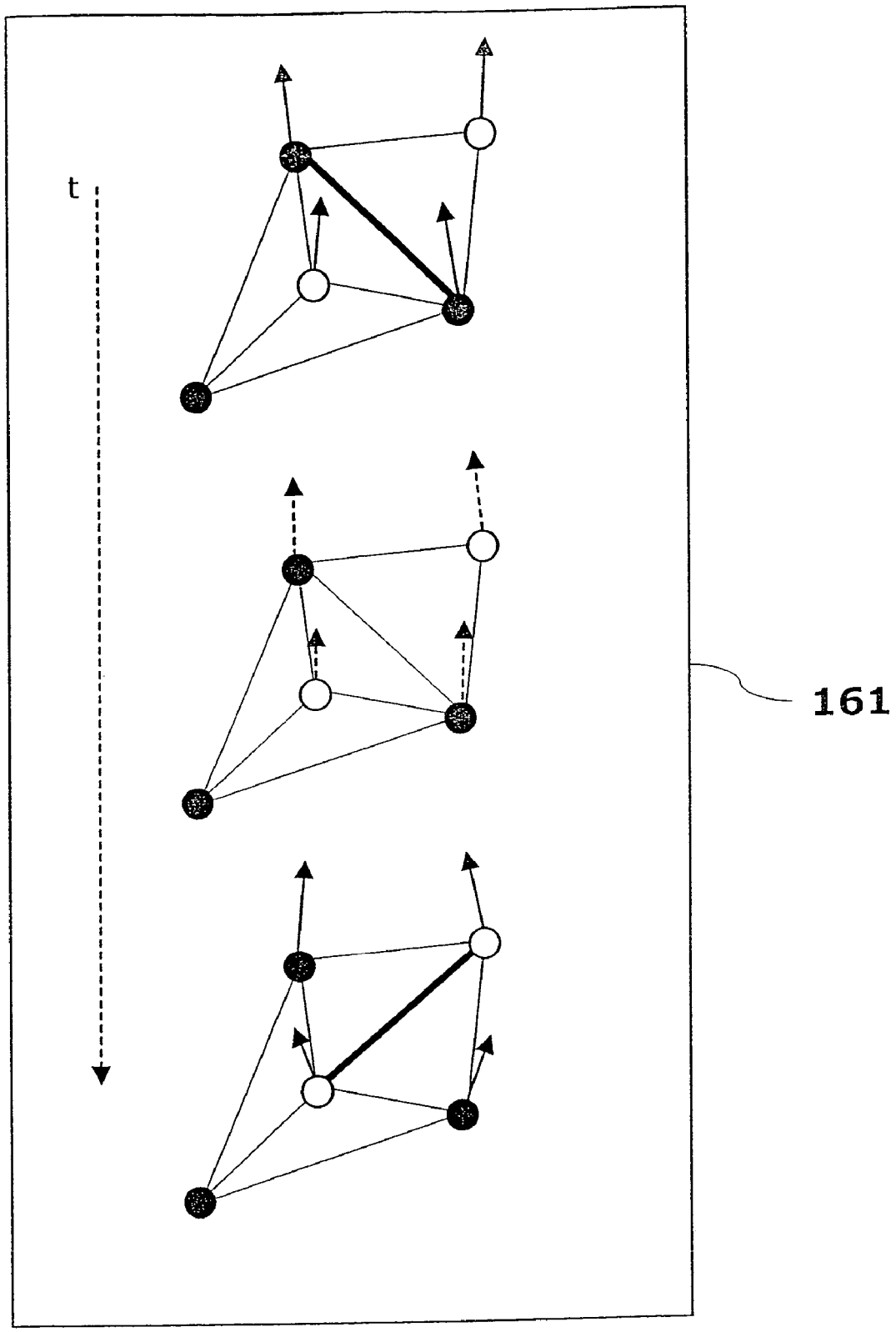
FIG. 16 describes an example embodiment of an interpolation of normals during swapping of the edges.

According to a preferred embodiment of the invention, the edge swap illustrated in FIG. 16 is only done during the display of the last iteration of the interpolation 161, in order to make the visual modification imperceptible to an observer.

We will now describe an example embodiment of the invention consisting of applying the previously described subdivision technique to meshes making up the objects in a three-dimensional scene.

Only nine filter coefficients α(3 . . . 11) defined by the following table are calculated, and vertices with a valence greater than or equal to 12 are not moved during the subdivision. The distribution of valences of the mesh is usually centred on the value 6, and vertices with a valence of more than 11 are rare.

| Valence n | α (n) |
| --- | --- |
| 3 | 1.5 |
| 4 | 5 |
| 5 | 8.30585 |
| 6 | 12 |
| 7 | 15.8839 |
| 8 | 19.844526 |
| 9 | 23.8213 |
| 10 | 27.7839 |
| 11 | 31.221 |

The user fixes the numbers of subdivision iterations v and s in the field of vision and on the silhouette of the object respectively, as a function of the graphic capabilities of the terminal used and the required geometric interpolation quality.

It may also be useful to refine regions adjacent to silhouette until an edge length less than the resolution of the output peripheral is obtained (in the event, one pixel).

The pseudo-code given below describes the adaptive refinement used:

M: mesh comprising F faces and S vertices requests:
   v iterations in the field of vision
   s iterations on the silhouette
Cancel the last adaptive refinement
For (v iterations)

```
{
    mark the faces of M in the field of vision
    start a hybrid subdivision on the marked faces
}
``` for (s iterations)

```
{
    mark the faces of M close to the silhouette
    start a hybrid subdivision on the marked faces
}
``` recalculate the normals on M per face
recalculate the normals of M per vertex

FIGS. 17 to 19 show the results obtained using the refinement process according to the invention.

Figure 17A:
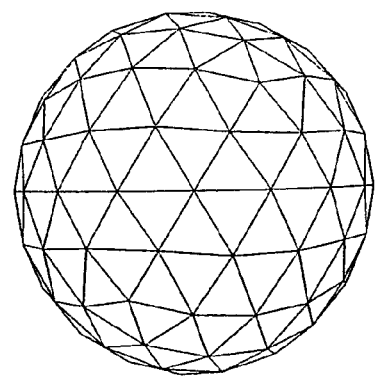
FIGS. 17a to 17c illustrate the results obtained by implementation of the process according to the invention for refinement of a sphere.
Figure 17B:
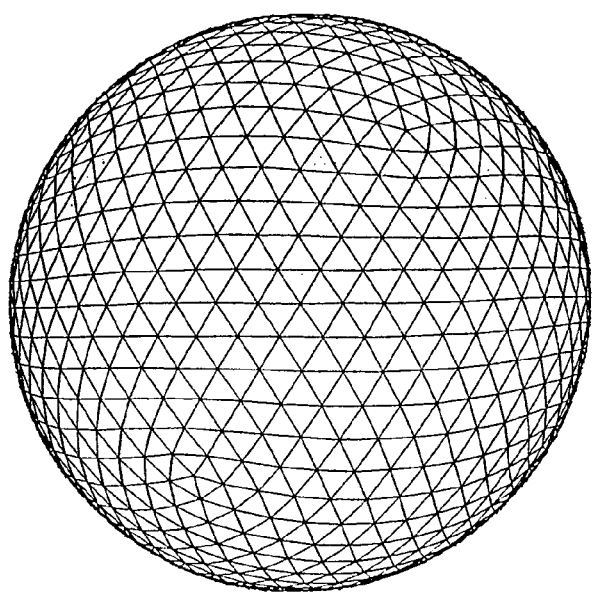
Figure 17C:
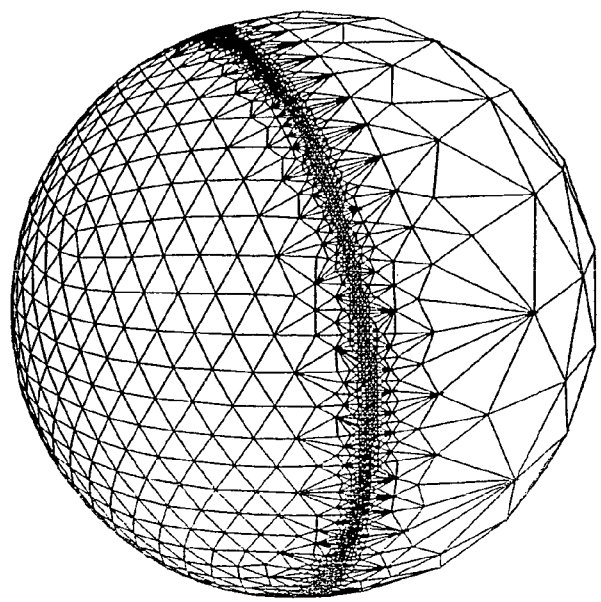

Thus, FIGS. 17a to 17c illustrate an example embodiment of the refinement process according to the invention on a spherical object shown in FIG. 17a. The meshes in FIGS. 17b and 17c are obtained after two iterations of the process in the field of vision on an observer, and after five iterations on the silhouette of the sphere. Note in FIG. 17b that the polygonal appearance of the contour of the sphere shown in FIG. 17a is significantly alleviated due to the refinement process according to the invention.

FIGS. 18a to 18c show the results obtained using the refinement process according to the invention on a typical mesh representing a face. FIG. 18a shows the original mesh 181 before implementation of the process according to the invention. FIG. 18b shows image 182 obtained after four iterations of the refinement process in the field of vision of an observer and eight iterations on the silhouette of the face 181.

Note in FIG. 18c that the polygonal aspect of the silhouette has been eliminated, and the geometry of the mesh has only been refined on visually relevant regions of the image 183.

Figure 19A:
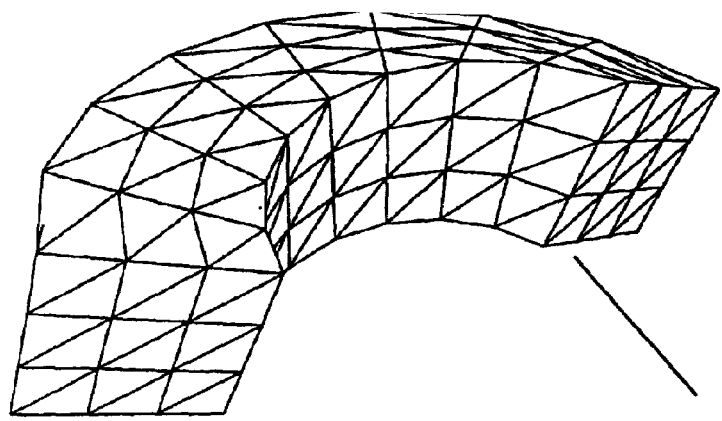
FIGS. 19a to 19c illustrate the adaptive behaviour of the process according to the invention on a mesh comprising sharp edges to be subdivided.
Figure 19B:
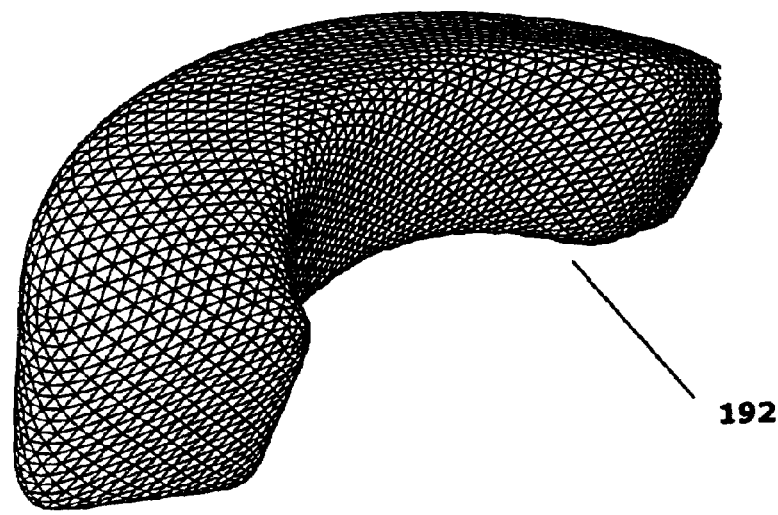
Figure 19C:
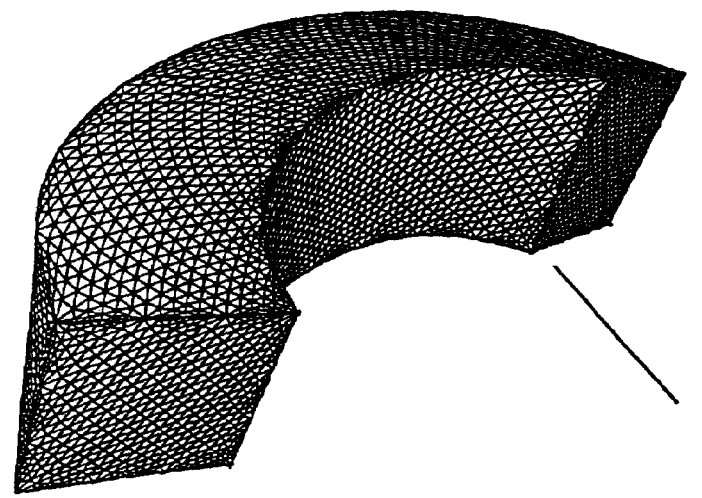

We will now present the results obtained with FIGS. 19a to 19c using the adaptive algorithm according to the invention on a mesh 191 comprising sharp edges to be subdivided.

The mesh 192 in FIG. 19b corresponds to the mesh obtained without detection of the corners and sharp edges of the mesh 191 prior to implementation of the refinement process. It can be seen that a smoothed surface is obtained.

On the other hand, the mesh 193 in FIG. 19c was adaptively subdivided keeping the corners and interpolating the regular sharp edges. It can be seen that the polygonal aspect of the regular sharp edges on the original mesh has been eliminated, and that the original surface has been interpolated.

The invention claimed is:

1. Refinement process of a mesh representative of an object in three dimensions, said mesh being composed of an arrangement of vertices and faces, said process comprising a step to select at least one region of interest on which said refinement of the mesh is made locally, characterised in that said mesh is a triangular mesh composed of an arrangement of vertices and triangular faces, each defined by three references to the vertices that it connects, and with three edges connecting each of said two vertices, in that said region(s) of interest belong(s) to the group comprising:

at least one silhouette of said object in three dimensions;

faces of said mesh belonging to an animated area of said object, and in that said process further comprises a hybrid subdivision step of at least some of said triangular faces, using a 1-to-3 centre of gravity subdivision operation, in order to divide each of said faces into three triangular faces by adding a vertex.

2. Refinement process according to claim 1, characterized in that said silhouette comprises triangular faces adjacent to a set of edges each sharing two triangular faces, a first face being oriented facing the eye of an observer and a second face oriented towards the opposite direction.

3. Process according to claim 1, characterized in that it also comprises a step to swap edges of at least some of said subdivided triangular faces, consisting of eliminating each edge of the triangular face before subdivision and replacing it by an edge connecting the vertex added to the opposite vertex to the deleted edge of the adjacent triangular face.

4. Process according to claim 1, characterized in that said selection step is used by an operator and/or according to a predetermined selection criterion.

5. Process according to claim 4, characterized in that said selection step is applied according to a predetermined detection criterion, at least one of said regions of interest belonging to the group comprising:

triangular faces located inside a pyramid of vision defined by the eye of an observer and a display window; and triangular faces oriented facing the eye of an observer;

said region(s) of interest belonging to the group comprising:

triangular faces adjacent to a set of edges each sharing two triangular faces, a first face being oriented facing the eye of an observer and a second face facing in the opposite direction; and triangular faces belonging to said animated area of the object.

6. Process according to claim 1, characterized in that it also comprises a position filtering step before subdivision of at least some of said vertices of the mesh.

7. Process according to claim 6, characterized in that said position filtering step before subdivision of a vertex of the mesh takes account of said vertex and the valence of its adjacent vertices, the valence being the number of edges arriving at a vertex.

8. Process according to claim 7, characterized in that said filter step implements a weighting coefficients calculation for each valence, obtained by analysing the asymptotic behaviour of a stochastic global subdivision matrix.

9. Process according to claim 1, characterized in that it applies at least one constraint to prevent implementation of said subdivision step on a given face and/or said swap step on a given edge and/or said filter step on a given vertex.

10. Process according to claim 9, characterized in that said at least one constraint prevents the implementation of a step belonging to the group comprising:

a step to swap a sharp edge, a step to filter the position of a vertex forming a corner;

a step to subdivide a triangular face located on a plane region of said object.

11. Process according to claim 1, characterized in that it applies a smoothing step on at least one sharp edge, consisting of interlacing a curve approximation process with a surface approximation process, implementing a subdivision operation on said sharp edge and/or a filter operation.

12. Process according to claim 1, characterized in that it also comprises a step to interpolate normals and/or the positions of vertices between the initial and final positions of said added vertices.

13. Application of the process according to claim 1, to any one of the following operations:
  data transmission on an internet and/or intranet type network;
  display of images related to cultural applications;
  display of images and/or image sequences related to a cooperative game;
  transmission and/or display of data related to cooperative work;
  remote shopping.

14. System for transmission of a triangular mesh representing an object in three dimensions between firstly an encoder and/or a data support, and secondly at least one display terminal,
  said mesh being composed of an arrangement of vertices and triangular faces, each defined by three references to the vertices that it connects, and the three edges each connecting two of said vertices,
  said mesh being refined locally on at least one selected region of interest, selected by means of selecting,
  characterized in that at least some of said triangular faces are subdivided by means of a hybrid subdivision, using a 1-to-3 centre of gravity subdivision operation, in order to divide each of said faces into three triangular faces by adding a vertex,
  in that said means of selecting said at least one region of interest are controlled by at least one of said display terminals,
  and in that said region(s) of interest belongs (or belong) to the group comprising:
    triangular faces adjacent to a set of edges each sharing two triangular faces, a first face being oriented facing the eye of an observer and the second face having the opposite orientation; and
    triangular faces belonging to an animated area of said object.

15. Decoding device for a triangular mesh representative of an object in three dimensions,
  said mesh being composed of an arrangement of vertices and triangular faces, each defined by three references to the vertices that it connects, and the three edges each connecting two of said vertices,
  said device using means of selecting at least one region of interest of said object, on which said mesh is decoded locally in a refined manner,
  characterised in that at least some of said triangular faces being subdivided by means of an hybrid subdivision, using a 1-to-3 centre of gravity subdivision operation, in order to divide each of said faces into three triangular faces by adding a vertex,
  and in that said region(s) of interest belong(s) to the group comprising:
    triangular faces adjacent to a set of edges each sharing two triangular faces, a first face being oriented facing the eye of an observer and the second face having the opposite orientation; and
    triangular faces belonging to an animated area of said object.

16. Display terminal for a representation of an object in three dimensions, said representation being associated with a mesh composed of an arrangement of vertices and faces,
  said terminal using means of locally refining said display, in order to synthesise and/or display at least one predetermined region of interest on said object in a refined manner,
  characterized in that at least some of said triangular faces being subdivided by means of a hybrid subdivision, using a 1-to-3 centre of gravity subdivision operation, in order to divide each of said faces into three triangular faces by adding a vertex,
  and in that said region(s) of interest belong(s) to the group comprising:
    triangular faces adjacent to a set of edges each sharing two triangular faces, a first face being oriented facing the eye of an observer and a second face facing in the opposite direction;
    triangular faces belonging to an animated area of said object.

* * * * *